United States Patent [19]

Berty

[11] Patent Number: 4,676,955

[45] Date of Patent: Jun. 30, 1987

[54] INSTRUMENT TO MEASURE CATALYTIC REACTION RATES

[75] Inventor: Jozsef M. Berty, Erie, Pa.

[73] Assignee: Berty Reaction Engineers, Ltd., Erie, Pa.

[21] Appl. No.: 559,711

[22] Filed: Dec. 9, 1983

[51] Int. Cl.$^4$ .............................................. B01J 8/02
[52] U.S. Cl. .................................. 422/130; 422/211; 422/225; 366/168; 366/316; 366/317
[58] Field of Search ............... 422/225, 226, 211, 130; 366/273, 274, 315, 317, 168, 169; 134/34, 184, 187

[56] References Cited

U.S. PATENT DOCUMENTS

| | | | |
|---|---|---|---|
| 1,340,517 | 5/1920 | Ashley | 134/187 |
| 2,301,044 | 11/1942 | Heard et al. | 196/50 |
| 2,495,895 | 1/1950 | Hervert | 366/273 |
| 2,689,267 | 9/1954 | Rollman | 260/633.15 |
| 3,245,665 | 4/1966 | Steel | 366/273 |
| 3,433,465 | 3/1969 | Szpur | 366/274 |
| 3,694,341 | 9/1972 | Luck | 366/273 |
| 4,465,377 | 8/1984 | De Bruyne | 366/280 |

OTHER PUBLICATIONS

Jankowski et al, *Chem. Techn.*, Berlin, 30, 9, Sep. 1978, p. 442, (reproduced in "A New Generation of Internal Recycle Reactors").
Chemical Engineering Progress, May 1974, "Reactor for Vapor-Phase Catalytic Studies", J. M. Berty, 78-84.
"20 Years of Recycle Reactors in Reaction Engineering," Jozsef M. Berty, paper presented at Nov. 1983 Diamond Jubilee/Annual Meeting of AIChE in Washington, D.C., pp. 1-16, list of FIGS. 1-10, and FIGS.

*Primary Examiner*—Barry S. Richman
*Assistant Examiner*—William R. Johnson

[57] ABSTRACT

A shaftless instrument achieves mixing by a rotor floating on a solution in association with an external magnet or magnetic field. The magnet is driven by a motor located outside of but in close proximity to said instrument. In one embodiment, a feed inlet is located in the vicinity of the lower portion of said instrument and communicates with the bottom interior of said instrument in the vicinity of the rotor location. During operation, a fluid feed supports said rotor a small distance above the instrument bottom and enables it to rotates above the fluid feed location.

4 Claims, 10 Drawing Figures

FIG. I

INSTRUMENT TO MEASURE CATALYTIC REACTION RATES

TECHNICAL FIELD

The present invention relates to an instrument to measure catalytic reaction rates. More specifically, the present invention relates to an instrument or reactor built on the recycle reactor principle and has an internal recycle blower that is floating on the feed fluid. The recycle blower creates large, internal recycle flow and thereby eliminates all internal temperature and concentration differences.

BACKGROUND ART

Heretofore, continuously stirred tank reactors (CSTRs) and especially catalytic recycle reactors (RRs), have all had a rotating shaft, most of it extending through the reactor body. The outside end was usually attached to a drive motor while the inside end supported the rotor of the blower. For example, U.S. Pat. No. 2,689,267 to Rollman relates to a reaction vessel to manufacture polymerized olefins employing granular catalyst in a basket and having an impeller therein. The impeller circulates the reacting materials and is connected to an external power source via a shaft which extends through the bottom of the reaction vessel. Such shaft must be sealed and hence the vessel is subjected to leaks, loss of pressure, and the like.

U.S. Pat. No. 2,301,044 to Heard relates to a catalyzed hydrocarbon reaction wherein no mechanical device for mixing or circulating is utilized. Rather, the feed stream, brought to an increased pressure by a pump, is discharged through a nozzle into a jet pump of the Venturi type and the resulting jet-pumping action creates the recirculation and mixing.

In a jet-pump type reactor, the recirculating flow rate is proportional to the feed flow discharged through the nozzle. Therefore, when the feed flow increases, both space velocity (in standard cubic feet per hour of total circulating gas per cubic feet of catalyst per hour =SCFH/cu.ft./hr.), and the mass velocity (expressed in lbs./sq.ft./hr.) are changing in the same ratio. Whereas, in internal recirculation reactors using a rotating blower, space velocity can be changed by changing the feed, while mass velocity remains unchanged since it depends on the blower rotor speed only. Changing blower rotor speed, at constant feed rate, changes the mass velocity only but does not effect the space velocity. This independence of the two kind of velocities is one of the major advantages of recycle reactors and this is lost in jetpump type recycle reactors.

In an article on "Reactor for Vapor-Phase Catalytic Studies," Chemical Engineering Progress, Volume 70, No. 5, May 1974, Berty, the present inventor herein, discusses an autoclave type reactor with regard to permitting catalyst testing and reaction kinetic studies. To overcome leaking and contamination problems, he utilizes a commercially available "Magnedrive" type shaft (Magnedrive is a registered trade name of Autoclave Engineers, Inc.). Using this shaft eliminates leaking and most contamination problems, but adds a long, heavy shaft that extends from the body and has some added dead volume around it. The long heavy shaft increases cost, size, and it requires graphite or RULON bearings. These bearings are used without lubrication and their wear products can cause some contamination even if the rotational speed is limited to a few thousand RPM. At higher RPMs, they wear out rapidly and increasingly contaminate the reactor by their wear products (RULON is a trademark of DuPont Co., and it is an iron oxide filled Teflon material).

In an article presented at the Spring National Meeting of the American Institute of Chemical Engineers in Houston, Texas on March 27-31, 1983, Berty describes a new generation of internal recycle reactors. These smaller and lighter reactors are easier to operate, but they still require a shaft to drive and to support the blower rotor. Page 5 of the article discusses future possibilities such as a shaftless model, where the blower rotor is suspended and supported by the feed fluid, much like a rotameter float is suspended by the flowing fluid in a conical tube. Rotating force is transmitted either by magnetic coupling or by the energy of an excess, higher pressure feed to the rotor.

In a similar paper presented at the November 1983 Diamond Jubilee Meeting of the American Institute of Chemical Engineers in Washington, D.C., Berty discusses the general history of various types of laboratory recycle reactors and continuously stirred reactors in general and also notes the conceptual design of the instrument set forth immediately above.

Except for the two recent Berty articles, the other publications and patents do not suggest any instruments, based on the recirculation reactor principle where the blower rotor is suspended by the feed fluid and is used to measure reaction rates.

DISCLOSURE OF INVENTION

It is therefore an aspect of the present invention to provide an instrument to measure catalytic reaction rates.

It is another aspect of the present invention to provide an instrument to measure catalytic reaction rates, as above, in a recycle reactor, where the recirculation blower rotor is suspended and supported by the feed fluid only, not requiring any shaft thereon, and lubrication between moving and fixed parts is done entirely by the feed fluid.

It is another aspect of the present invention to provide an instrument to measure catalytic reaction rates, as above, in a fixed bed configuration, where a catalyst basket is provided in the middle of the vessel to hold the catalyst, and the reaction fluid is circulated through it.

It is still a further aspect of the present invention to provide an instrument to measure catalytic reaction rates, as above, in the gradientless, recirculation mode, where the recirculating blower rotor is either magnetically coupled to an outside rotating magnet, or to a rotating magnetic field.

It is still an additional aspect of the present invention to provide an instrument to measure catalytic reaction rates, as above, where the recirculations of the reacting material is caused by a rotating blower, that is suspended by one part of the feed, while an excess of the feed is tangentially discharged to another set of turbine vanes.

These and other aspects of the present invention will become apparent from the following specification.

In general, a shaftless catalytic reaction vessel, comprises: a vessel, a shaftless blower rotor, and a feed fluid, said rotor supported by said feed fluid.

BEST MODE FOR CARRYING OUT THE INVENTION

Figure 1:
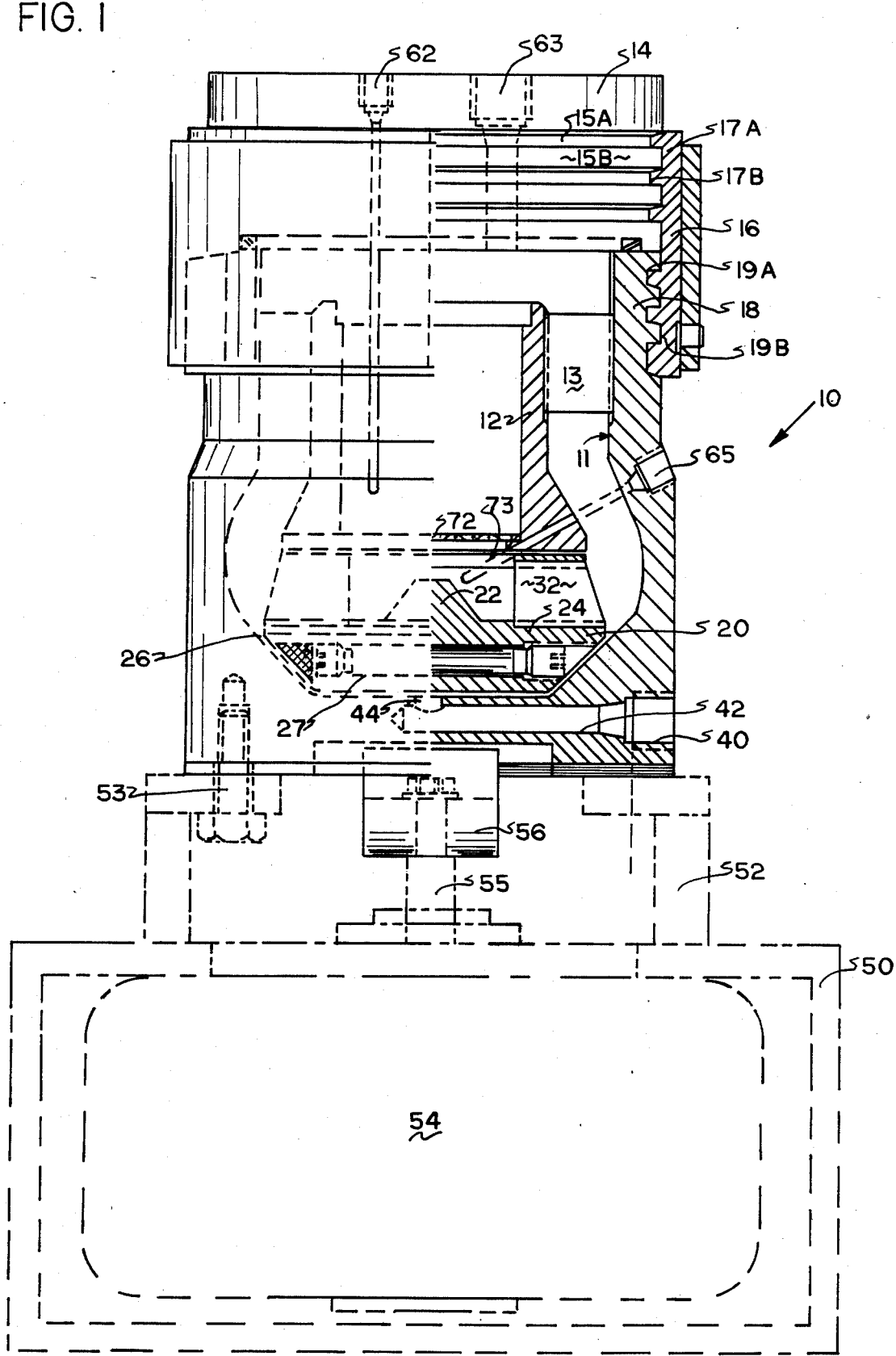
FIG. 1 is a side elevational view and a partial sectional view of a shaftless catalytic reactor according to the present invention.

The reaction instrument or vessel according to the present invention is generally indicated by the numeral 10. The vessel contains an interior cavity or reaction zone confined by wall 11. A catalytic basket 12 resides within said vessel and is attached thereto through support brackets 13 which in turn are connected to vessel 10. A cover 14 resides over the top of the reaction vessel and has grooves 15a and projections 15b thereon. Side sleeve 16 also has grooves 17a and projections 17b thereon. Top portion 18 of reaction vessel 10 also has grooves 19a and projections 19b thereon. Grooves and projections 15a and 15b as well as 19a and 19b are generally in the form of recesses and threads and matingly engage the grooves and projections of sleeve 16. Through this manner, cover 14 may be secured to the vessel. Of course, any other conventional cover can be utilized as a cover which has a flange thereon and is bolted to said vessel.

Figure 2:
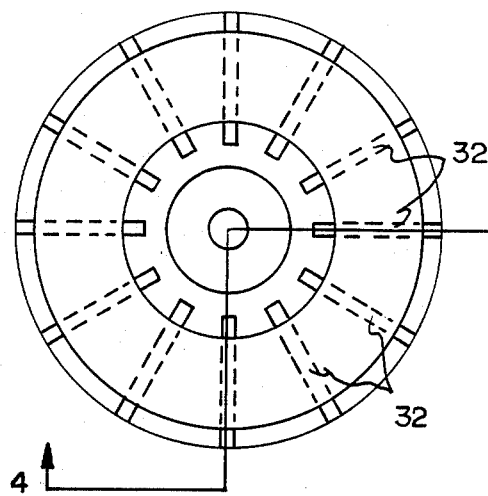
FIG. 2 is a top plan view of the rotor residing in said catalytic reactor.
Figure 3:
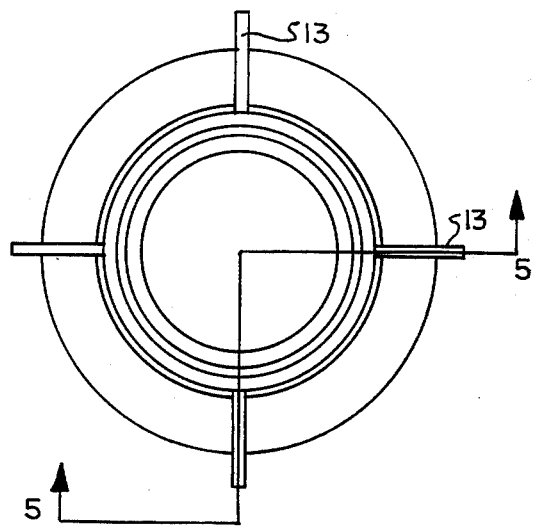
FIG. 3 is a top plan view of a catalytic basket residing within the reaction vessel of the present invention.
Figure 4:
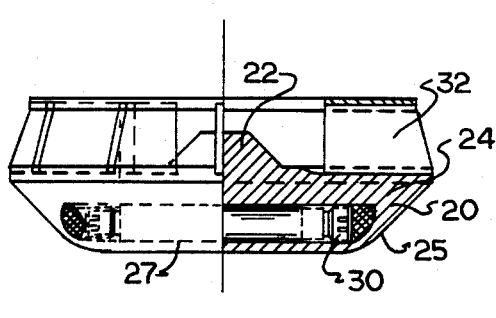
FIG. 4 is a partial sectional side-elevational view taken on lines 4-4 of FIG. 2.
Figure 5:
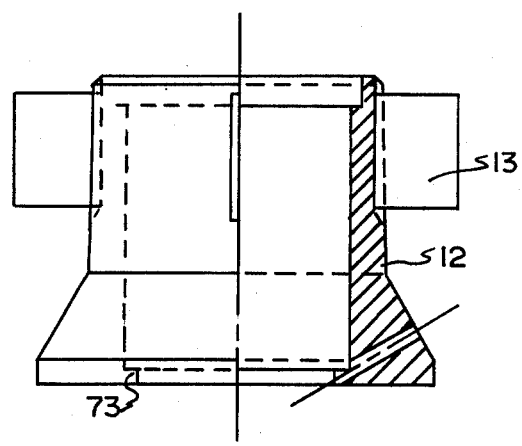
FIG. 5 is a partial cross-sectional view taken on lines 5—5 of FIG. 3.

Rotor 20 generally resides within the bottom portion of the cavity. As shown in FIGS. 1, 2 and 4, rotor 20 has a hub portion 22 as well as base portion 24. In order to prevent the rotor from reacting with various fluids or chemical compounds within the reaction vessel, as well as to prevent it from being oxidized or the like, it is generally made of an inert metal such as stainless steel, e.g., of the 300 series type, hasteloys, monels, various bronze alloys, or other non-magnetic metals. In order to permit rotation of rotor 20, its bottom portion is desirably contoured to the shape of the reaction vessel. Of course, various shapes may exist as for example the shape shown in FIGS. 1 and 4 wherein rotor 24 has a flat bottom portion and two upwardly inclined side portions. The width of the rotor is designed such that the side portions 25 extend to within a fraction of an inch of the angular bottom reaction vessel wall as shown in FIG. 1. Such a close conformation or proximity of the rotor and the bottom of the reaction vessel permits the rotor to "float" upon the feed fluid as set forth below. As apparent from the drawings, the provision of an independent rotor eliminates any need for a shaft, or an aperture having plugs or seals therein. Naturally, to permit the rotor to turn, a precise alignment of rotor side 25 with the bottom portion 26 of the vessel is important. Hence, regardless of the configuration of the rotor or the vessel bottom, such contour or shape should be the same throughout the circumference of said vessel bottom portion as well as throughout the circumference of said rotor.

Regardless of the shape of rotor 20, it has a channel or hollow portion 27 therein generally extending throughout the entire width of the rotor. A magnet such as a bar magnet is inserted into channel 27 such that both poles are generally equal distance from the center or hub portion of the rotor. Bar magnet 28 can be of any conventional magnetic material as well known to the art. Ceramic magnets, alnico, etc., that retain their magnetic properties at high temperatures are preferred. In order to maintain bar magnet 28 within the channel, each end of channel 27 has a set or cap screw applied thereto. Cap screws 30 thus accurately retain bar magnetics 28 centered within the rotor.

As apparent from FIGS. 2 and 4, rotor 20 has a plurality of vanes 32 extending upwardly therefrom and generally extending in a radially outward direction from the center point of said rotor. Vanes 32 act as an impeller and force the fluid from the inside of the rotor as in the vicinity of the hub to the walls of the reaction vessel. Vanes 32 are desirably made of an inert metal such as stainless steel, or other metals as used in the vessel can also be utilized for the rotor including the vanes.

Reaction vessel 10 has a feed inlet 40 at the lower portion thereof with a channel 42 extending from between the feed inlet portion to a vessel entrance 44 leading into cavity 11. Hence, during utilization of the reaction vessel, a fluid feed stream can be attached in any conventional manner, for example, threads, etc., to the cavity. The input rate of the feed fluid as such, coupled with the rotation of said rotor, causes the rotor to rotate upon a thin layer of the fluid, be it either a gas or liquid. As such, there is very little frictional engagement with the vessel interior surfaces. Generally, the separation between the rotor and the reaction vessel bottom surfaces is from about 0.02 to about 0.0001 inches, and preferably from 0.002 to about 0.0002 inches.

Reaction vessel 10 generally resides upon a housing 50 having frame 52 extending therefrom. The vessel is attached to frame 52 through any fastening means such as bolts 53. A motor 54 exists within housing 50 and has a shaft 55 extending therefrom. To the end of the shaft is attached a space U-shaped magnet 56. U-shaped magnet 56 naturally has a north pole and a south pole so that upon rotation thereof, a magnet coupling exists with bar magnet 28 residing within rotor 20. In other words, as U-shaped magnet 56 is rotated, the corresponding pole of bar magnet 28 will rotate to keep in alignment therewith. As magnet 56 is rotated, the rotor magnet will rotate, thereby causing vanes 32 to act as an impeller and distribute fluid from the inside area of the rotor to an area outside thereof. Generally, any conventional U-shaped magnet may be utilized. Naturally, it generates a magnetic field such that it penetrates the bottom of reaction vessel 10 and exerts an influence upon bar magnet 28. Accordingly, U-shaped magnet 56 is positioned as close as possible to the bottom of the reaction vessel. Similarly, a bar magnet of the rotor is located as close to the bottom thereof as is possible. The bottom of the reaction vessel is desirably as thin as possible within the desired operating parameters of temperature and pressure of the reaction vessel to ensure safe operation thereof. Alternatively, a magnetic field generated by any conventional device can be utilized to cause said rotor to rotate.

Cover 14 of the reaction vessel is equipped with a desirable number of ports to accommodate various desired functions. Thus, thermocouple 62 extends into the catalytic bed portion, of the reaction vessel to measure the temperature therein. Outlet 63, having a desirable valve means thereon, not shown, permits a desired temperature as well as pressure to be generally maintained within the reaction vessel as well as to bleed off a desirable amount of product. Similarly, the vessel may have any number of desirable ports therein such as thermocouple 65 which extends inwardly from the side wall into the hub portion of the rotary area. The pressure within the vessel may be measured as through outlet portion 63. In order to maintain a catalyst within the catalyst basket 12, a screen 72 resides at the bottom portion of the basket as upon basket lip 73.

Naturally, the reaction vessel of the present invention can be used for any number of reactions including catalytic type reactions. Generally, the operation of the reaction vessel is as follows. The catalyst is inserted into the catalytic basket and rests upon screen 72. The vessel is closed by inserting cover 14 on the top thereof and threading side sleeves 16 thereon until a secure engagement is obtained. The reaction vessel is tested for leaks, as well as loss of pressure. The vessel is then flushed with an inert gas such as nitrogen to remove all air and undesirable reactive gases contained therein. Through feed inlet 40, a feed gas is fed into the reaction vessel. An amount of feed gas is continuously fed until a desirable pressure is obtained. Meanwhile, the reaction vessel is heated as from the sides thereof, through any heating means, for example, an electric furnace, and the like, until a temperature reaches a desirable range for the specific reaction to be utilized. During the pressurization and increase in temperature, motor 54 can be actuated so as to turn U-shaped magnet 56 at a desirable speed. Once a desirable pressure and temperature has been reached, the reaction is allowed to continue for a suitable amount of time. During the reaction period, the fluid in the upper portion of vessel cavity 11 is drawn downwardly through the catalyst bed by impeller vanes 32 and then outwardly to the side of the bottom portion of the cavity. The fluid is then forced upwardly and once again is drawn downwardly into the catalyst bed. Such recycling continues throughout the reaction, with a small amount of product being removed through outlet port 63. To compensate for such removal, an equal amount of fluid is fed into the vessel through cavity entrance 44. Since generally a steady amount of product is continuously removed, a corresponding and steady amount of feed fluid must be fed to the reactor. Such a provision ensures that rotor 20 rotates upon a bed of thin fluid.

Figure 6:
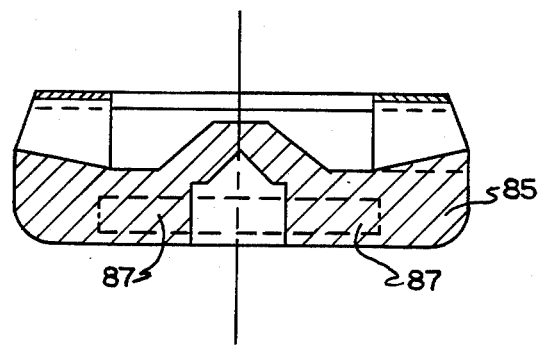
FIG. 6 is a partial sectional, side-elevational view of an alternative rotor.
Figure 7:
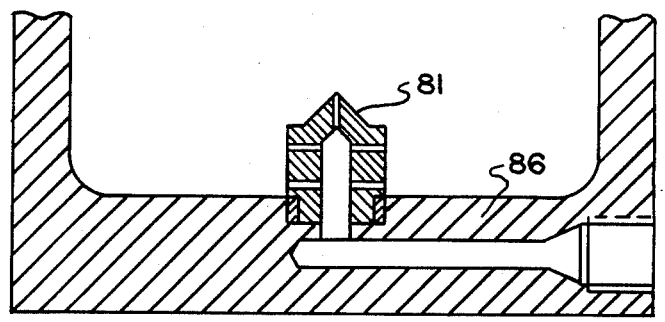
FIG. 7 is a cross-sectional, side-elevational view of an alternative vessel bottom.

In FIG. 7, an alternative structure and method of supporting the rotor by the feed is shown. For simplicity sake, only the bottom parts of the vessel, where a basic variation exists, are shown. In contrast to FIG. 1 where the rotor was supported by the feed fluid on its outer perimeter, in FIG. 6 a central guide 81 is used for the feed to enter the vessel. In operation, a small gap, in the 0.02 to 0.0001 inch range exists between the rotor and the fixed guide, with the guide centering the rotor. The part of the feed that is fed through the center guide lubricates the rotors central cylindrical cavity and lifts up the entire matingly engagable rotor 85, shown in FIG. 6, again only to the above stated range above the reactor bottom 86. For transmitting, the rotating force two bar magnets 87 are built in the rotor, as above, and an outside rotating magnetic field, or magnet, will penetrate the non-magnetic stainless steel and force the rotor on the inside to rotate with it synchronously. The rotational speed of the outside magnet or field can be controlled to some desired value between 150 to 30,000 RPM. This speed is the same as with the embodiments of FIGS. 1-5. Moreover, the reactor bottom is different and is rounded as shown in FIG. 7. Naturally, the rotor shape conforms to the reactor bottom.

Figure 8:
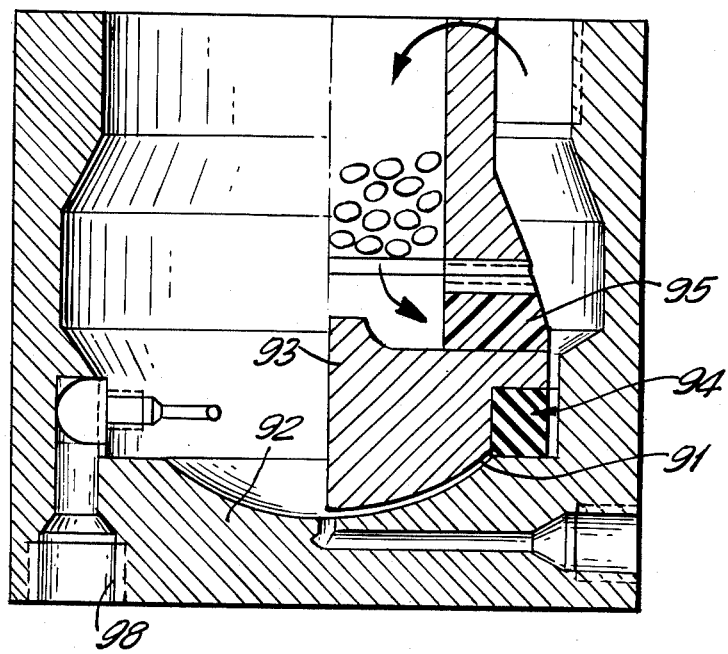
FIG. 8 is a cross-sectional, side-elevational view of yet another alternative rotor and vessel bottom.
Figure 9:
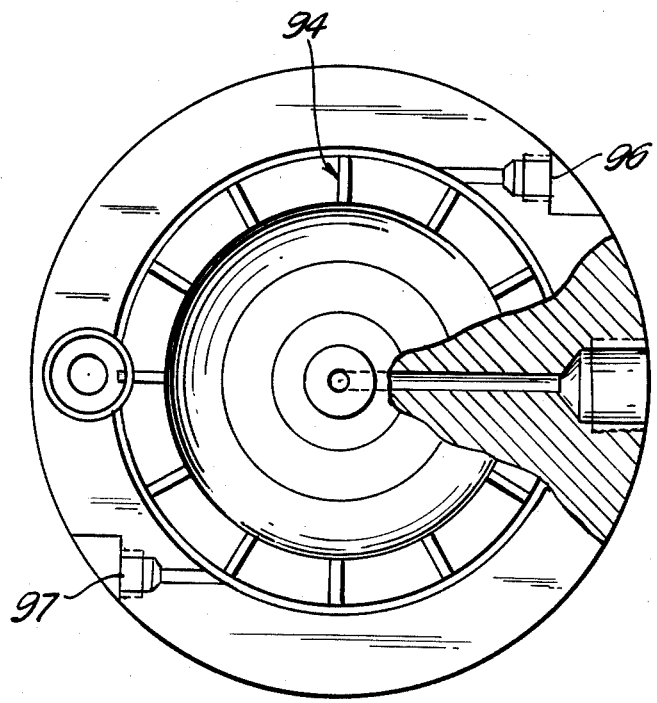
FIG. 9 is a partial cross-sectional view taken on lines 9—9 of FIG. 8.

In FIGS. 8 and 9, yet another embodiment of the present invention is illustrated. Two basic variations, as compared to the embodiment in FIG. 1, are shown. First, the shape of the bottom 91 of the rotor and the matching part 92 of the housing are spherical. This spherical shape lowers the center of gravity so that the rotor will tend to keep its original, vertical rotational axis. The angle of the spherical segment has to be larger than 90 degrees and less than 180 degrees, so that as the support fluid lifts the spherical body, the gap generated by this action has to be of converging wedge shape at the discharge end, to support the load in a stable way. This occurs only between the angular limits if one calculates the total flow cross section normal to the spherical surface.

Figure 10:
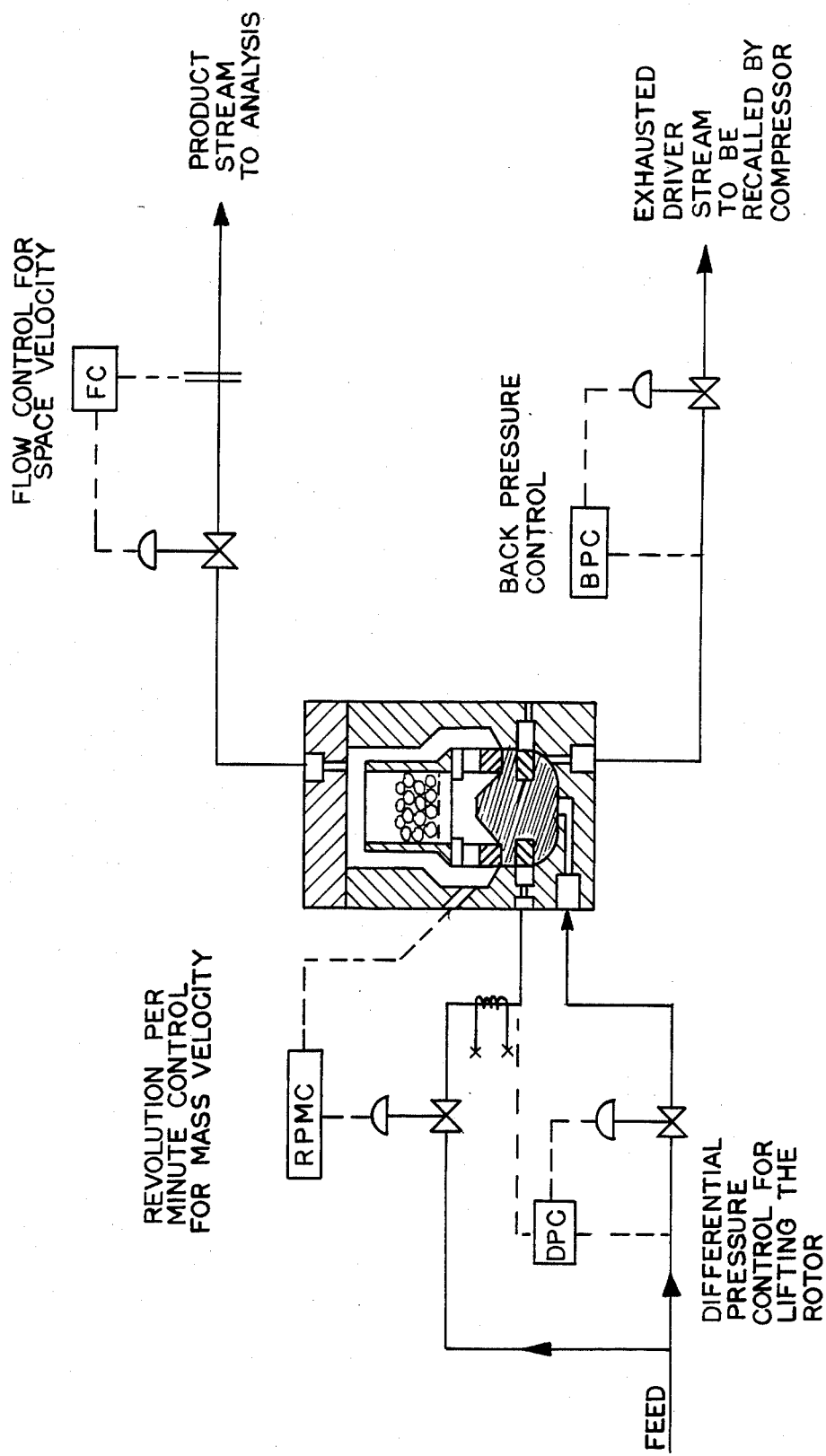
FIG. 10 is a flow diagram utilizing the reactor of the present invention.

The second difference in FIG. 9 is that instead of the magnetic coupling to generate the rotational driving force, a feed gas turbine type drive is applied. Below vanes 95 for the blower that circulates the reacting fluid across the catalyst basket above is a separate set of vanes 94 for the turbine drive. An excess of feed fluid is discharged through feed inlets 96 and 97 to bring rotor 93 in motion. In order to retain the previously mentioned independence of mass and space velocities, the driving feed fluid has to be controlled independently from the feed flow that enters the circulating cavity. For this purpose, the excess feed is discharged through bottom opening 98. A possible control scheme is given in FIG. 10 which describes the various streams and controls.

While in accordance with the patent statutes, a preferred mode and best embodiment has been described in detail, the scope of the invention is not limited thereto, but is measured by the scope of the attached claims.

What is claimed is:

1. A shaftless reaction vessel useful in carrying out catalytic reaction rate measurements comprising:
    (a) a vessel with an interior wall;
    (b) means defining a reaction zone in said vessel to contain solid particulate catalyst to be tested, said reaction zone further defining an annular cavity with the interior wall of said reaction vessel to provide a return channel;
    (c) a catalyst bed located within said reaction zone;
    (d) a rotor means located below said reaction zone, said rotor means containing two sets of vanes, a first set or turbine drive vanes for rotating said rotor means and a second set of blower vanes for circulating a reactant within said vessel;
    (e) a first feed means for introducing a first portion of a feed stream so as to contact said turbine drive vanes and
    (f) a second feed means for introducing a second portion of a feed stream at a location below said rotor thereby maintaining said rotor means in a state of levitation.

2. A shaftless reaction vessel as in claim 1 wherein said rotor further includes a generally spherical bottom and wherein said second set of vanes is located below said first set of vanes.

3. A shaftless reaction vessel according to claim 1 further including means defining a centrally located opening in the bottom of said vessel communicating with said second feed means for introducing the second portion of the feed used to levitate said rotor.

4. A shaftless reaction vessel according to claim 3 further including a centrally located guide means disposed adjacent said central opening interiorly of said reaction vessel.

* * * * *